(12) United States Patent
Tanaka et al.

(10) Patent No.: US 11,517,881 B2
(45) Date of Patent: Dec. 6, 2022

(54) EXHAUST GAS PURIFICATION CATALYST

(71) Applicant: Mitsui Mining & Smelting Co., Ltd., Tokyo (JP)

(72) Inventors: Hiroki Tanaka, Saitama (JP); Haruka Shimizu, Saitama (JP); Masaaki Inamura, Saitama (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 202 days.

(21) Appl. No.: 16/971,147

(22) PCT Filed: Aug. 23, 2018

(86) PCT No.: PCT/JP2018/031211
§ 371 (c)(1),
(2) Date: Aug. 19, 2020

(87) PCT Pub. No.: WO2019/187199
PCT Pub. Date: Oct. 3, 2019

(65) Prior Publication Data
US 2022/0193638 A1    Jun. 23, 2022

(30) Foreign Application Priority Data
Mar. 28, 2018    (JP) .............................. JP2018-063119

(51) Int. Cl.
*B01J 23/44* (2006.01)
*B01D 53/94* (2006.01)
(Continued)

(52) U.S. Cl.
CPC ............ *B01J 23/44* (2013.01); *B01D 53/944* (2013.01); *B01J 23/464* (2013.01);
(Continued)

(58) Field of Classification Search
CPC ...... B01J 23/44; B01J 23/464; B01J 35/0006; B01D 53/944; B01D 2255/1023;
(Continued)

(56) References Cited

U.S. PATENT DOCUMENTS 5,250,489 A    10/1993  Betta et al.
5,332,554 A    7/1994   Yasaki et al.
(Continued)

FOREIGN PATENT DOCUMENTS

JP    4-118053 A    4/1992
JP    6-506290 A    7/1994
(Continued)

OTHER PUBLICATIONS

International Search Report (ISR) dated Oct. 9, 2018 filed in PCT/JP2018/031211.

*Primary Examiner* — Tom P Duong
(74) *Attorney, Agent, or Firm* — Rankin, Hill & Clark LLP

(57) ABSTRACT

The present invention provides an exhaust gas purifying catalyst including a first catalyst layer (12). The first catalyst layer (12) includes a first section (14) and a second section (15) in an exhaust gas flow direction, the first section (14) being located on an upstream side in the exhaust gas flow direction relative to the second section (15). The first section (14) and the second section (15) both contain a catalytically active component including a specific element. A concentration of the specific element is higher in the first section (14) than in the second section (15). A concentration gradient of the specific element contained in the first section (14) in a thickness direction of the catalyst layer (12) is milder than a concentration gradient of the specific element contained in the second section (15) in the thickness direction.

9 Claims, 6 Drawing Sheets

(51) Int. Cl.
  *B01J 23/46* (2006.01)
  *B01J 35/00* (2006.01)
  *F01N 3/10* (2006.01)

(52) U.S. Cl.
  CPC .......... *B01J 35/0006* (2013.01); *F01N 3/103* (2013.01); *B01D 2255/1023* (2013.01); *B01D 2255/1025* (2013.01); *B01D 2255/2063* (2013.01); *B01D 2255/2065* (2013.01); *B01D 2255/2068* (2013.01); *B01D 2255/20715* (2013.01); *B01D 2255/9022* (2013.01)

(58) Field of Classification Search
  CPC .... B01D 2255/1025; B01D 2255/2063; B01D 2255/2065; B01D 2255/2068; B01D 2255/20715; B01D 2255/9022; F01N 3/103
  USPC .......................................................... 422/177
  See application file for complete search history.

(56) References Cited

U.S. PATENT DOCUMENTS

| | | | |
|---|---|---|---|
| 2001/0026838 A1* | 10/2001 | Dettling | .............. C04B 41/5105 427/430.1 |
| 2004/0076565 A1* | 4/2004 | Gandhi | ................... F01N 3/108 422/177 |
| 2004/0254073 A1* | 12/2004 | Wei | .................... B01D 53/9431 502/527.12 |
| 2006/0057046 A1* | 3/2006 | Punke | .................. B01J 37/0248 422/177 |
| 2006/0142151 A1 | 6/2006 | Taki et al. | |
| 2008/0038172 A1* | 2/2008 | Chen | ..................... B01J 37/0244 423/213.2 |
| 2013/0150236 A1 | 6/2013 | Aoki | |
| 2015/0202572 A1* | 7/2015 | Chiffey | .................... B01J 23/42 502/241 |
| 2017/0297005 A1 | 10/2017 | Onoe et al. | |
| 2017/0298797 A1* | 10/2017 | Onoe | ..................... B01J 23/464 |
| 2018/0023444 A1 | 1/2018 | Saito et al. | |
| 2018/0080359 A1* | 3/2018 | Price | .................... F01N 13/009 |

FOREIGN PATENT DOCUMENTS

| | | |
|---|---|---|
| JP | 2006-181476 A | 7/2006 |
| JP | 2014-18724 A | 2/2014 |
| JP | 2017-104825 A | 6/2017 |
| WO | 2016/039302 A1 | 3/2016 |
| WO | 2016/185386 A1 | 11/2016 |

\* cited by examiner

Fig. 7

| | Amount of Pd Loaded [g/L] (per volume of applied portion) | | | | | | Relationship between Regions A to C and First to Third Sections | | | Gradient of Pd Concentration in Thickness Direction | | | | Gradient of Pd Concentration in Flow Direction | Evaluation | | |
|---|---|---|---|---|---|---|---|---|---|---|---|---|---|---|---|---|---|
| | Region A (L 25%) | | Region B (L 25%) | | Region C (L 50%) | | First section | Second section | Third section | First section a1/a2 | Second section b1/b2 | Third section c1/c2 | (a1/a2)/(b1/b2) | a3/b3 | Aged T50 at low temperature increase rate Aged T50 (°C) 30°C/min | Aged T50 at high temperature increase rate Aged T50 (°C) 400°C/min | Aged purification rate η500 [%] |
| | Uniform loading | Surface enrichment | Uniform loading | Surface enrichment | Uniform loading | Surface enrichment | | | | | | | | | | | |
| Comp. Ex. 1 | 6 | | 6 | | 2 | | A+B | C | - | 1.03 | 1.01 | - | 1.01 | 3.0 | 298.6 | 378.6 | 94.5 |
| Comp. Ex. 2 | | 6 | | 6 | 2 | | A+B | C | - | 2.25 | 1.02 | - | 2.20 | 3.0 | 303.2 | 369.9 | 95.4 |
| Comp. Ex. 3 | 10 | | 2 | | 2 | | A | B+C | - | 1.11 | 1.00 | - | 1.11 | 5.0 | 304.3 | 362.0 | 93.8 |
| Comp. Ex. 4 | | 10 | 2 | | 2 | | A | B+C | - | 1.87 | 1.01 | - | 1.86 | 5.0 | 311.1 | 354.1 | 92.8 |
| Ex. 1 | 3 | 3.5 | 2 | 3.5 | 2 | | A | B | C | 1.54 | 1.81 | 1.00 | 0.85 | 1.2 | 297.8 | 359.2 | 96.6 |
| Ex. 2 | 4 | 3 | 2 | 3 | 2 | | A | B | C | 1.29 | 1.54 | 1.00 | 0.84 | 1.4 | 298.4 | 357.4 | 95.4 |
| Ex. 3 | 6 | 2 | 2 | 2 | 2 | | A | B | C | 1.13 | 1.36 | 1.00 | 0.83 | 2.0 | 300.5 | 356.2 | 94.9 |
| Ex. 4 | 2 | 5.5 | 1 | 5.5 | 1 | | A | B | C | 2.12 | 2.39 | 1.00 | 0.89 | 1.2 | 297.1 | 355.1 | 96.7 |
| Ex. 5 | 3 | 5 | 1 | 5 | 1 | | A | B | C | 1.83 | 2.32 | 1.00 | 0.79 | 1.3 | 298.3 | 353.8 | 96.4 |

EXHAUST GAS PURIFICATION CATALYST

TECHNICAL FIELD

The present invention relates to an exhaust gas purifying catalyst.

BACKGROUND ART

Exhaust gas purifying catalysts for purifying three components (i.e., carbon monoxide (CO), hydrocarbon (HC), and nitrogen oxide ($NO_x$)) discharged from internal combustion engines such as diesel engines and gasoline engines have been proposed before. These three components are purified mainly using noble metals.

There has been proposed an exhaust gas purifying catalyst that utilizes the exhaust gas purification effect of noble metals and has a catalyst layer divided into an upstream section and a downstream section in the exhaust gas flow direction, the upstream section and the downstream section being different in the configuration. For example, Patent Literature 1 discloses an exhaust gas purifying catalyst designed such that the noble metal concentration in the lower catalyst layer is different between the upstream side and the downstream side in the exhaust gas flow direction. Patent Literature 2 discloses an exhaust gas purifying catalyst designed such that the noble metal concentration in a catalyst layer decreases gradually from the upstream side toward the downstream side in the exhaust gas flow direction so as to be high in the vicinity of an upstream end portion.

CITATION LIST

Patent Literatures

Patent Literature 1: US 2013150236 A1
Patent Literature 2: US 2018023444 A1

SUMMARY OF INVENTION

Conventionally, the following is considered: when the amount of the noble metal is larger on the upstream side than on the downstream side of the exhaust gas purifying catalyst in the exhaust gas flow direction as disclosed in Patent Literatures 1 and 2, CO oxidation and HC oxidation, which are exothermic reactions, actively take place on the upstream side, and thus the temperature of the entire catalyst can be increased efficiently; this temperature increase enhances the $NO_x$ reducibility, and thus the purification performance for CO, HC, and $NO_x$ at low temperatures can be increased as compared to the case where the noble metal is dispersed uniformly on the upstream side and the downstream side.

However, in addition to the recent trend toward strict environmental standards and cost reduction, demand is increasing for thermal durability against repeated driving, and thus, a major issue to be addressed is that it is required to increase the purification rate during start-up of an internal combustion engine, when the temperature of exhaust gas is low, by using a reduced amount of noble metals. However, it cannot be said that the effect on the above-described issue is sufficient even if the amount of noble metal on the upstream side is simply increased than on the downstream side in the exhaust gas flow direction as disclosed in Patent Literature 1.

Also, in the case where a gradient is applied to the amount of the noble metal in the exhaust gas flow direction as disclosed in Patent Literature 2, aggregation of the catalytically active component is likely to occur due to repeated driving, for which thermal durability is required, and it is thus difficult to obtain thermal durability of the catalyst.

Accordingly, it is an object of the present invention to provide an exhaust gas purifying catalyst to solve the problem encountered with conventional technology as described above.

The inventors of the present invention have conducted an in-depth study on the configuration of an exhaust gas purifying catalyst that not only delivers improved exhaust gas purification performance during start-up of the internal combustion engine with a reduced amount of noble metals, but also has excellent thermal durability.

As a result, the inventors have configured an exhaust gas purifying catalyst not only such that a catalyst layer is divided into two or more sections in the exhaust gas flow direction, an upstream section having a higher noble metal concentration than a downstream section, but also such that the gradient of the noble metal concentration in the thickness direction is milder in the upstream section than in the downstream section in the exhaust gas flow direction, and the inventors have surprisingly found that in such an exhaust gas purifying catalyst, the dispersibility of catalytically active components can be obtained, and that thermal durability of the exhaust gas purifying catalyst can be achieved while improving the exhaust gas purification performance during start-up of the internal combustion engine.

The present invention has been made based on the findings described above, and provides an exhaust gas purifying catalyst including a first catalyst layer including a first section and a second section in an exhaust gas flow direction, the first section being located on an upstream side in the exhaust gas flow direction relative to the second section, wherein the first section and the second section both contain a catalytically active component including a specific element, a concentration of the specific element is higher in the first section than in the second section, and a concentration gradient of the specific element contained in the first section in a thickness direction of the first catalyst layer is milder than a concentration gradient of the specific element contained in the second section in the thickness direction.

BRIEF DESCRIPTION OF DRAWINGS

FIG. 7 shows the results of Comparative Examples 1 to 4 and Examples 1 to 5 with schematic diagrams of the exhaust gas purifying catalysts produced in Comparative Examples 1 to 4 and Examples 1 to 5.

DESCRIPTION OF EMBODIMENTS

Hereinafter, the present invention will be described by way of preferred embodiments thereof, but the present invention is not limited to the embodiments given below.

Figure 1:
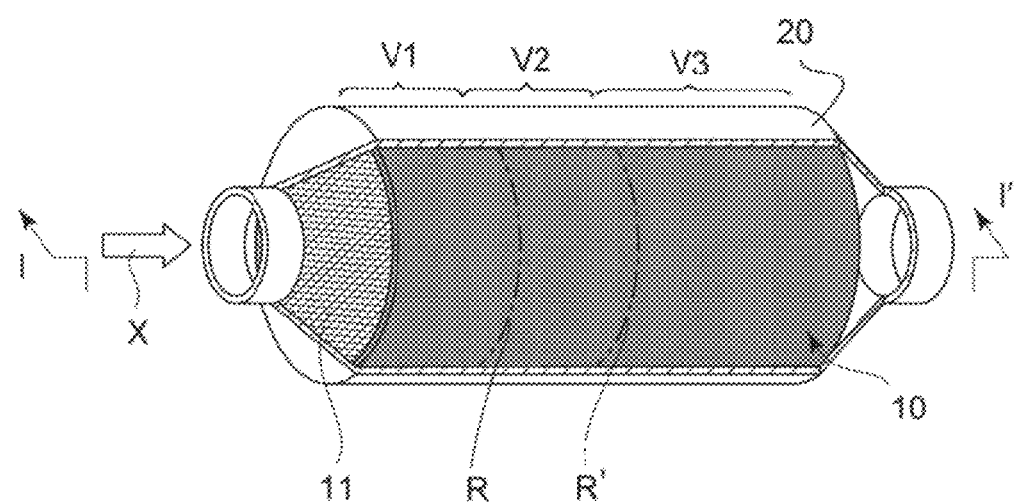
FIG. 1 is a schematic diagram showing an exhaust gas purifying catalyst according to an embodiment of the present invention in a state of being housed in a casing through which an exhaust gas flows.
Figure 2:
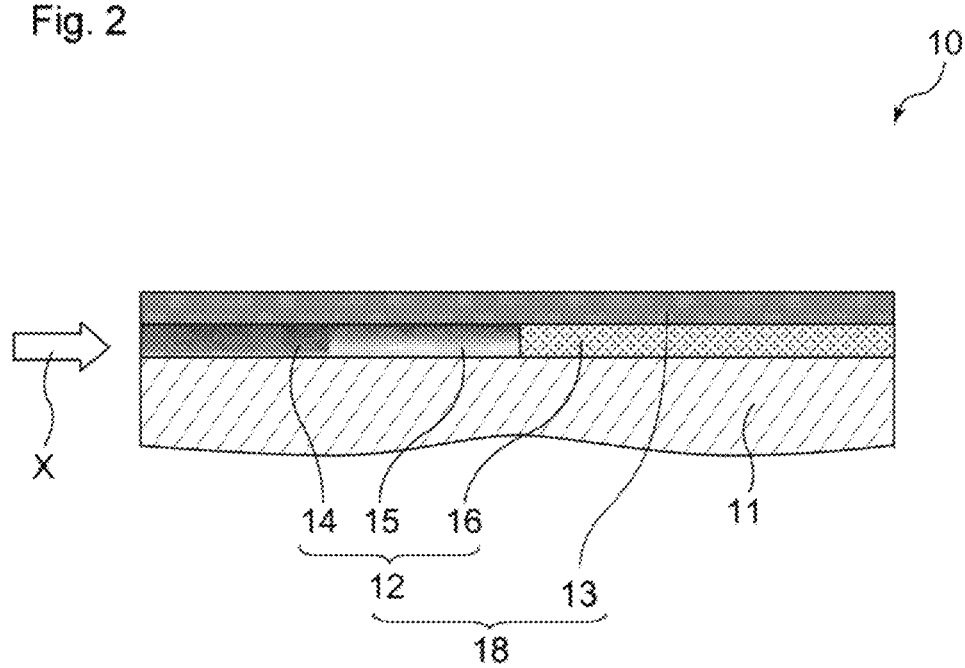
FIG. 2 is a partially enlarged schematic diagram of a cross section of the exhaust gas purifying catalyst shown in FIG. 1, taken along the line I-I'.

An example of an exhaust gas purifying catalyst according to the present embodiment is shown in FIGS. 1 and 2. As shown in FIG. 1, an exhaust gas purifying catalyst 10 is housed in a casing 20, and is placed in a path through which an exhaust gas discharged from an internal combustion engine (not shown) flows. As shown in FIGS. 1 and 2, the exhaust gas purifying catalyst 10 includes a porous substrate 11 and a catalyst layer 18 formed on the porous substrate 11. The catalyst layer 18 may be a monolayer or a multilayer including two or more catalyst layers that have different compositions. In the case where the catalyst layer 18 is a multilayer, one of the layers included in the multilayer may include a first section 14 and a second section 15, which are arranged in the exhaust gas flow direction X. The first section 14 is located on the upstream side in the exhaust gas flow direction X relative to the second section 15. In the example shown in FIG. 2, the catalyst layer 18 has a lower catalyst layer 12 and an upper catalyst layer 13 formed on a surface of the lower catalyst layer 12 that is the other side than the porous substrate side, and the lower catalyst layer 12 includes the first section 14 and the second section 15.

In the example shown in FIG. 2, the first section 14 and the second section 15 are in contact with the porous substrate 11, but another catalyst layer may be interposed between the porous substrate 11 and the catalyst layer 12. Still another catalyst layer may be formed on a surface of the upper catalyst layer 13 that is the other side than the lower catalyst layer side, or the upper catalyst layer 13 may be the outermost layer.

The first section 14 is located on the upstream side in the exhaust gas flow direction X relative to the second section 15. As will be described later, the first section 14 and the second section 15 have mutually different concentration gradients of a specific element, which is a catalytically active component, in the thickness direction of the catalyst layer 12. In the catalyst layer 12 including the first section 14 and the second section 15, it is preferable that the first section 14 and the second section 15 be in contact with each other in the exhaust gas flow direction X with no gap therebetween, in view of efficiently increasing the temperature of the second section 15 by heat generated by exothermic reactions such as HC oxidation and CO oxidation facilitated by the catalytically active component contained in the first section 14. Hereinafter, the term "thickness direction" means the thickness direction of the catalyst layer 12 unless otherwise stated.

Figure 3:
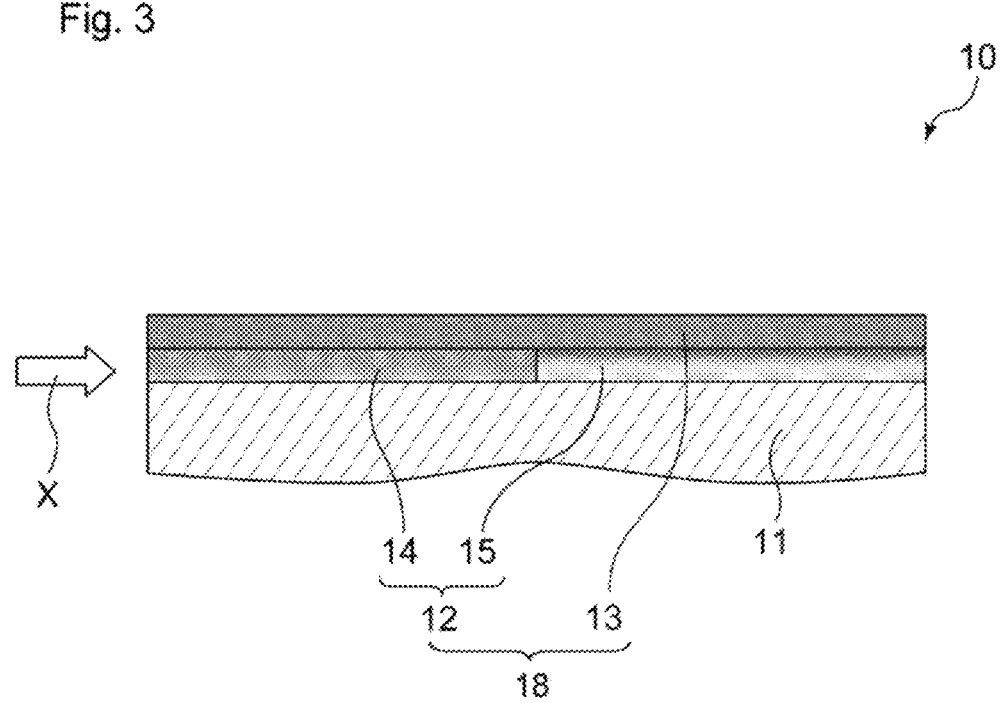
FIG. 3 is a diagram showing an exhaust gas purifying catalyst according to another embodiment, the diagram corresponding to FIG. 2.

In the example shown in FIG. 2, the lower catalyst layer 12 includes the third section 16, which is located on the downstream side of the second section 15 in the exhaust gas flow direction X. In the catalyst layer 12, it is preferable that the second section 15 and the third section 16 be in contact with each other in the exhaust gas flow direction X with no gap therebetween, in view of efficiently increasing the temperature of the third section 16 by heat generated by exothermic reactions such as HC oxidation and CO oxidation facilitated by the catalytically active component contained in the second section 15. As will be described later, it is preferable that the third section 16 and the second section 15 have mutually different concentration gradients of the specific element in the thickness direction, and also have mutually different concentrations of the specific element. As shown in FIG. 3, the exhaust gas purifying catalyst 10 does not necessarily have the third section 16.

The porous substrate 11 may have the shape of honeycomb, a DPF, or a GPF. Examples of the material of the porous substrate 11 include ceramics such as alumina ($Al_2O_3$), mullite ($3Al_2O_3$-$2SiO_2$), cordierite ($2MgO$-$2Al_2O_3$-$5SiO_2$), aluminum titanate ($Al_2TiO_5$), and silicon carbide (SiC), and metal materials such as stainless steel. An exhaust gas purifying catalyst 10 including a porous substrate 11 and a catalyst layer formed on the surface of the porous substrate 11 is also called a catalyst converter. In the example shown in FIG. 1, the porous substrate 11 has a shape elongated in one direction, and is disposed such that the lengthwise direction of the porous substrate 11 matches the exhaust gas flow direction X.

The first section 14, the second section 15, and the optional third section 16 contain a specific element. The specific element herein refers to a single element and is, for example, palladium (Pd), platinum (Pt), or rhodium (Rh). In particular, in view of obtaining good purification performance for carbon monoxide (CO) and hydrocarbon (HC), and a warming function, the specific element is preferably palladium (Pd) or platinum (Pt), and more preferably palladium (Pd).

In the exhaust gas purifying catalyst 10, the concentration gradient of the specific element contained in the first section 14 in the thickness direction is milder than the concentration gradient of the specific element contained in the second section 15 in the thickness direction. Specifically, the expression "the concentration gradient of the specific element contained in the first section 14 in the thickness direction" refers to the ratio a1/a2, which is the ratio of the mass a1 of the specific element on the surface side of the first section to the mass a2 of the specific element on the other side (porous substrate side) than the surface side of the first section when the first section 14 is divided in half along the thickness direction, i.e., divided in the surface side and the other side (porous substrate side).

Likewise, the expression "the concentration gradient of the specific element contained in the second section 15 in the thickness direction" refers to the ratio b1/b2, which is the ratio of the mass b1 of the specific element on the surface side of the second section to the mass b2 of the specific element on the other side (porous substrate side) than the surface side of the second section when the second section 15 is divided in half along the thickness direction, i.e., divided in the surface side of the catalyst layer 12 and the other side (porous substrate 11 side).

The expression "the concentration gradient of the specific element contained in the first section in the thickness direction is milder than the concentration gradient of the specific element contained in the second section in the thickness direction" means that the ratio a1/a2 is smaller than the ratio b1/b2.

As a result of the gradient of the specific element contained in the first section 14 in the thickness direction milder than that in the second section 15 and the concentration of the specific element contained in the first section 14 higher than that in the second section 15, the specific element is appropriately dispersed in the exhaust gas flow direction X. Thus, although the purification performance for CO, HC, and $NO_x$ at low temperatures is enhanced by containing the specific element such that the concentration of the specific element is higher in the first section 14 than in the second section 15, aggregation under conditions in which high temperature durability is required can be prevented by the appropriate dispersion design in which the specific element is not excessively concentrated due to the above-described configuration (a1/a2<b1/b2). Accordingly, an exhaust gas purifying catalyst can be obtained that delivers excellent exhaust gas purification performance during start-up of the internal combustion engine even after undergoing conditions in which thermal durability is required.

The concentration gradient of the specific element contained in the first section 14 is preferably continuous from the surface side of the catalyst layer 12 to the substrate side of the catalyst layer 12 in the thickness direction in the first section 14. The same applies to the second section 15 and the third section 16. As used herein, the expression "the concentration gradient of a component is continuous in the thickness direction" means that, for example, the mass of the component decreases continuously from the surface side toward the substrate side in the thickness direction.

In view of ensuring a sufficient amount of catalytically active component on the surface side of the first section 14 and enhancing the exhaust gas purification performance at low temperatures, the ratio a1/a2 is preferably 0.9 or more, more preferably 1.0 or more, even more preferably 1.1 or more, and particularly preferably 1.2 or more. On the other hand, the upper limit of the ratio a1/a2 is not particularly limited, but the ratio is preferably 3.0 or less, more preferably 2.5 or less, and even more preferably 2.0 or less in view of further enhancing the thermal resistance of the catalytically active component. From the above viewpoints, the ratio a1/a2 is preferably 1.0 or more and 3.0 or less, more preferably 1.0 or more and 2.5 or less, even more preferably 1.0 or more and 2.5 or less, and particularly preferably 1.0 or more and 2.0 or less.

Also, in view of further enhancing the exhaust gas purification performance at low temperatures by providing the catalytically active component more on the surface side of the second section 15, the ratio b1/b2 is preferably 1.1 or more, more preferably 1.2 or more, and even more preferably 1.3 or more. On the other hand, the upper limit of the ratio b1/b2 is not particularly limited, but the ratio is preferably 5.0 or less, and more preferably 2.5 or less in view of further improving the thermal resistance of the catalytically active component. From the above viewpoints, it is more preferable that the ratio b1/b2 is 1.2 or more and 2.5 or less.

The ratio of a1/a2 to b1/b2 is preferably 0.33 or more and 0.95 or less, more preferably 0.50 or more and 0.90 or less, and even more preferably 0.70 or more and 0.90 or less.

The concentration gradient of a specific element contained in the first section 14 can be specifically determined using the following method.

Figure 5:
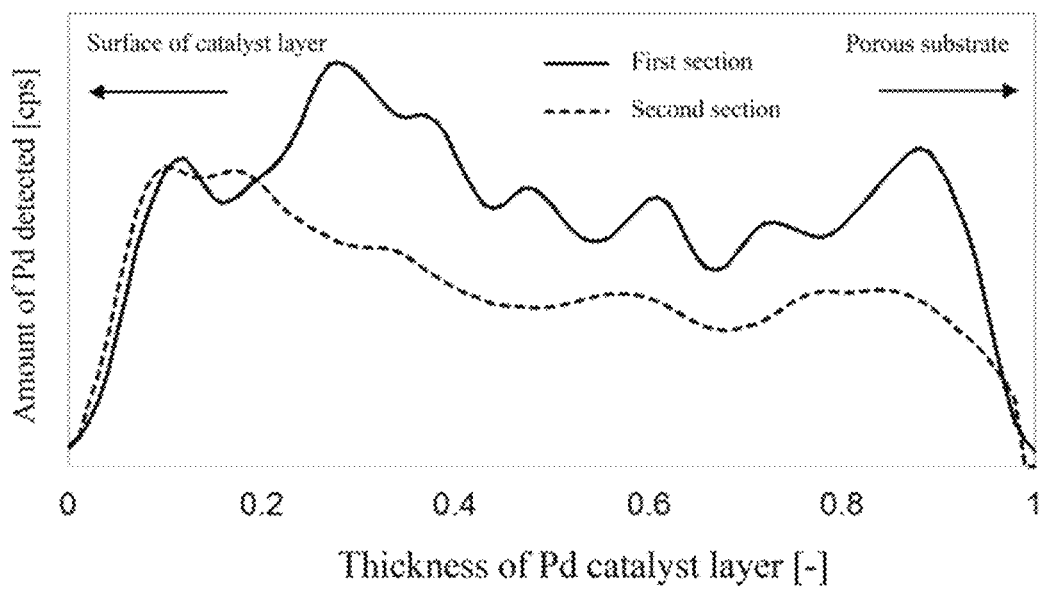
FIG. 5 shows fluctuation curves obtained through line analysis using EDX performed on the first section and the second section of the exhaust gas purifying catalyst produced in Example 2.

The exhaust gas purifying catalyst including the substrate is cut along a cross section perpendicular to the exhaust gas flow direction using a band saw or the like. The cut piece of the catalyst is embedded in an epoxy resin to obtain a sample having a surface in which the cross section of the catalyst is exposed. A fluctuation curve of the specific element in the sample is obtained by digitizing a distribution of the specific element (unit: cps) through EDX line analysis of the sample, and in the fluctuation curve, the ratio of an integral value of the counts on the surface side, which extends toward the surface from a position at half the length of the catalyst layer 12 in the thickness direction, to an integral value of the counts on the substrate side, which extends toward the substrate from that position, is obtained. The ratio obtained is converted to a mass ratio, which is defined as the concentration gradient of the specific element in the thickness direction. The integral values of the counts can be obtained by horizontally mounting a sample on a stage without any incline, performing measurement in each of 10 observation fields under the conditions of an acceleration voltage of 25 kV, an electron beam spot diameter of 1 μm, and a measurement distance of 100 μm, and determining the average value of the measurement results obtained in 10 observation fields. Specifically, a distribution curve of the specific element in the first section 14 in the thickness direction as defined above is obtained for each of 10 observation fields in the first section 14. The distribution of the specific element is normalized in the thickness direction such that the total thickness of the first section 14 is regarded as 1, as shown in FIG. 5, and the results of the analysis for 10 observation fields are averaged. In this way, an average distribution of the specific element in the thickness direction of the first section 14 can be obtained. The same applies to the second section 15.

For example, in the case where the first section 14 is formed directly on the porous substrate 11, the boundary in the thickness direction between the porous substrate 11 and the first section 14 can be confirmed based on changes in the concentration of the specific element (for example, Pd) determined by EDX line analysis performed on the catalyst layer in the thickness direction, and, for example, an inflection point obtained by differentiating the Pd concentration distribution curve can be used as the reference. In this case, the boundary between the porous substrate and the first section 14 is a point (A) between a region in which there is substantially no Pd and a region in which Pd is detected. The same applies to the case where an upper catalyst layer 13 is formed on a surface of the first section 14 that is the other side than the substrate side. For example, in the case where Pd is contained in the first section 14 and not in the upper catalyst layer 13, the boundary between the first section 14 and the upper catalyst layer 13 is a point (B) at which the Pd detection intensity drops sharply to 20% or less relative to a maximum detection intensity.

Herein, the amount of a catalytically active component including a specific element is the mass in terms of metal; however, in the exhaust gas purifying catalyst, the catalytically active component is not necessarily present in the form of a metal, and may be present in the form of an oxide.

The concentration of the specific element contained in the first section 14 is preferably higher than the concentration of the specific element contained in the second section 15 in view of enhancing the exhaust gas purification performance during start-up of the engine. In view of providing the catalytically active component concentratedly on the upstream side and thus enhancing the exhaust gas purification performance during start-up of the engine, the ratio of the concentration a3 of the specific element contained in the first section 14 to the concentration b3 of the specific element contained in the second section 15, a3/b3, is preferably 1.1 or more. The ratio a3/b3 is preferably 3.0 or less, in view of enhancing the dispersibility of the catalytically active component by providing a certain amount of the catalytically active component even on the downstream side and in view of enhancing the purification performance at high SV. From the above viewpoints, the ratio a3/b3 is more preferably 1.2 or more and 3.0 or less.

The concentration of the specific element contained in the second section 15 is preferably higher than the concentration of the specific element contained in the third section 16 in view of enhancing the exhaust gas purification performance during start-up of the engine. In view of providing the catalytically active component concentratedly on the upstream side and thus enhancing the exhaust gas purification performance when starting the engine, the ratio of the concentration b3 of the specific element contained in the second section 15 to the concentration c3 of the specific element contained in the third section 16, b3/c3, is 1.1 or more, preferably 1.5 or more, and more preferably 2.0 or more. The ratio b3/c3 is 100.0 or less, and preferably 30.0 or less, in view of enhancing the dispersibility of the catalytically active component by providing a certain amount of the catalytically active component even on the downstream side, and in view of enhancing the purification performance at high SV.

As used herein, "the concentration of the specific element" can be determined by dividing the catalyst along a boundary between sections, which is specified using a method described below, to form a cross section perpendicular to the lengthwise direction of the catalyst, pulverizing each section, and performing compositional analysis using an XRF, an ICP, or the like. The concentration of the specific element contained in a particular section is an amount obtained by dividing the mass of the specific element contained in the section by the volume of the portion of the porous substrate 11 in which the section is present. In FIG. 1, the boundary between the first section 14 and the second section 15 is indicated by the line R, the boundary between the second section 15 and the third section 16 is indicated by the line R', and the volumes of portions in which the first section 14, the second section 15, and the third section 16 are present are respectively indicated by V1, V2, and V3; however, these do not limit the present invention in any way. As used herein, the term "the volume of the substrate" refers to a volume calculated from the diameter and the length of the substrate including internal pores and the catalyst layers.

In the case where the lower catalyst layer 12 includes the third section 16 downstream of the second section 15 in the exhaust gas flow direction X, the gradient c1/c2 of the specific element contained in the third section 16 in the thickness direction is preferably milder than the gradient b1/b2 of the specific element contained in the second section 15 in the thickness direction. Specifically, the gradient c1/c2 is the ratio of the mass c1 of the specific element on the surface side of the third section to the mass c2 of the specific element on the other side (porous substrate side) than the surface side of the third section when the third section 16 is divided in half along the thickness direction of the catalyst layer 12, i.e., divided in the surface side and the other side (porous substrate 11 side), and the ratio c1/c2 is preferably smaller than the concentration gradient b1/b2 in the second section 15. The ratio c1/c2 is preferably 0.4 or more in view of thermal resistance of the catalytically active component. From the above viewpoints, the ratio c1/c2 is more preferably 0.6 or more and 1.5 or less, even more preferably 0.8 or more and 1.2 or less, and even much more preferably 0.9 or more and 1.2 or less. The ratio c1/c2 can be determined by the above-described method using EDX.

As described above, it is preferable in the present invention that the concentration control described above be performed on the single specific element; however, the same concentration control as above may be additionally performed on the total amount of catalytically active components, specifically, the total amount of palladium (Pd), platinum (Pt), and rhodium (Rh). For example, the total concentration of the three different catalytically active components may be higher in the second section 15 than in the first section 14 and the gradient of the total concentration of the three different catalytically active components in the first section 14 in the thickness direction may be milder than the gradient of the total concentration of the three different catalytically active components in the second section 15 in the thickness direction. The third section 16 and the second section 15 may have mutually different concentration gradients of the total concentration of the three different catalytically active components in the thickness direction. The third section 16 and the second section 15 may also have mutually different total concentrations of the three different catalytically active components. The gradient of the total concentration of the three different catalytically active components in the first section 14 in the thickness direction may fall within the same range as the preferred range of the ratio a1/a2 described above. The gradient of the total concentration of the three different catalytically active components in the second section 15 in the thickness direction may fall within the same range as the preferred range of the ratio b1/b2 described above. The gradient of the total concentration of the three different catalytically active components in the third section 16 in the thickness direction may fall within the same range as the preferred range of the ratio c1/c2 described above. The ratio of the gradient of the total concentration of the three different catalytically active components in the second section 15 to the gradient of the total concentration of the three different catalytically active components in the first section 14 in the thickness direction may fall within the same range as the preferred range of the ratio (b1/b2)/(a1/a2) described above. The ratio of the total concentration of the three different catalytically active components in the first section 14 in terms of mass per unit volume to the total concentration of the three different catalytically active components in the second section 15 in terms of mass per unit volume may fall within the same range as the preferred range of the ratio a3/b3 described above. The ratio of the total concentration of the three different catalytically active components in the second section 15 in terms of mass per unit volume to the total concentration of the three different catalytically active components in the third section 16 in terms of mass per unit volume may fall within the same range as the preferred range of the ratio b3/c3 described above.

It is preferable that the first section 14, the second section 15, and the optional third section 16 further contain a support component that loads the catalytically active component in view of efficiently exhibiting the exhaust gas purification performance of the catalytically active component. As the support component herein, an oxygen storage component (also called an "OSC material", OSC being an abbreviation for oxygen storage capacity) and an inorganic oxide other than the oxygen storage component can be used. In the case where the exhaust gas purifying catalyst according to the present invention is used for a gasoline engine in which the theoretical air-to-fuel ratio is controlled, the catalyst layer 12 preferably contains an oxygen storage component as a support component because a high purification rate can be obtained in a stable manner even when the air-to-fuel ratio varies. More preferably, the first section 14 and the second section 15 each contain an oxygen storage component, and even more preferably, the first section 14, the second section 15, and the third section 16 each contain an oxygen storage component. In the case where an oxygen storage component is contained, it is preferable that the oxygen storage component and an inorganic oxide other than the oxygen storage component be present in a mixed state.

In the case where any two or more sections of the first section 14, the second section 15, and the third section 16 contain an oxygen storage component, the two or more sections may each contain an oxygen storage component of the same composition or may contain oxygen storage components of different compositions. Also, the first section 14, the second section 15, and the third section 16 may each contain an inorganic oxide other than the oxygen storage component of the same composition or may contain inorganic oxides other than the oxygen storage component of different compositions.

The oxygen storage component is preferably a ceria-zirconia composite oxide (hereinafter also referred to as $CeO_2$—$ZrO_2$) because the resulting exhaust gas purifying catalyst has high OSC. $CeO_2$—$ZrO_2$ is a solid solution of $CeO_2$ and $ZrO_2$. Whether a solid solution of $CeO_2$ and $ZrO_2$ has been formed can be confirmed by checking whether or not a single phase derived from $CeO_2$—$ZrO_2$ has formed, using an X-ray diffractometer (XRD). The oxygen storage component is preferably porous because it can easily load the catalytically active component. The porous oxygen storage component may have a BET specific surface area of 30 $m^2/g$ to 210 $m^2/g$.

In the exhaust gas purifying catalyst according to the present invention, one or more of the first section 14, the second section 15, and the third section 16 contain $CeO_2$—$ZrO_2$, and this oxygen storage component may contain a rare earth element other than cerium or an alkaline earth metal element such as Ba, Sr, or Ca. Examples of the rare earth element other than cerium include scandium (Sc), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). These rare earth elements may be added as, for example, an oxide to the oxygen storage component. The oxide of a rare earth element is a sesquioxide ($Ln_2O_3$, where Ln is a rare earth element) except for the case where the rare earth element is praseodymium (Pr) or terbium (Tb). The oxide of a rare earth element may be a composite oxide of two or more of the rare earth elements. Praseodymium oxide is normally $Pr_6O_{11}$, and terbium oxide is normally $Tb_4O_7$. The oxide of a rare earth element other than cerium may or may not form a solid solution together with $CeO_2$—$ZrO_2$. Whether or not the oxide of a rare earth element other than cerium and $CeO_2$—$ZrO_2$ have been formed into a solid solution can be checked in the same manner as described above using an X-ray diffractometer (XRD).

As the oxygen storage component, it is also possible to use an oxide of an element of which the valence state is likely to change under conditions for use of the catalyst, such as Mn, Fe, or Cu, or a composite oxide that contains any of these elements.

The exhaust gas purifying catalyst according to the present invention has sufficient OSC when the first section 14, the second section 15, and the optional third section 16 contain an OSC material.

In the exhaust gas purifying catalyst according to the present invention, the amount of $CeO_2$ in the first section 14 is preferably 10 mass % or more and 50 mass % or less, and more preferably 15 mass % or more and 40 mass % or less, in view of the balance between exhibiting OSC to enhance the exhaust gas purification performance at low temperatures and obtaining heat resistance. The amount of $ZrO_2$ in the first section 14 is preferably 10 mass % or more and 60 mass % or less, and more preferably 15 mass % or more and 50 mass % or less. As used herein, the amount of $CeO_2$ and that of $ZrO_2$ respectively include the amount of $CeO_2$ derived from $CeO_2$—$ZrO_2$ and the amount of $ZrO_2$ derived from $CeO_2$—$ZrO_2$ (hereinafter, the same applies to the amount of $CeO_2$ and that of $ZrO_2$).

Also, the amount of $CeO_2$ and the amount of $ZrO_2$ in the second section 15 and the third section 16 are preferably within the same ranges as those described above for the amount of $CeO_2$ and the amount of $Zr_2$ in the first section.

In the case where the lower catalyst layer 12 contains an oxide of a rare earth element other than cerium as an OSC material other than $CeO_2$—$ZrO_2$, the amount of the oxide of a rare earth element other than cerium in the first section 14 is preferably 30 mass % or less, and more preferably 3.0 mass % or more and 20 mass % or less, in view of further enhancing thermal stability. In the case where the second section 15 or the third section 16 contain an oxide of a rare earth element other than cerium, the amount of the oxide of a rare earth element other than cerium in the second section 15 or the third section 16 is preferably within the same range as described above for the amount of the oxide of a rare earth element other than cerium in the first section.

Examples of an inorganic oxide other than the oxygen storage component that may be contained in the first section 14, the second section 15, and the optional third section 16 include metal oxides other than the above-described inorganic oxides, such as rare earth oxides ($Re_2O_3$) such as $Al_2O_3$, $ZrO_2$, $SiO_2$, $TiO_2$, and $La_2O_3$, oxide materials based on zeolite (aluminosilicate), MgO, ZnO, and $SnO_2$, and composite oxide materials of these materials. Other examples include phosphates and borates of Al, Zr, Si, Ti, rare earth elements, Mg, Zn, and the like, and poorly soluble sulfates of alkaline earth metals such as Ba and Sr. The inorganic oxide other than the oxygen storage component is preferably porous. The porous inorganic oxide other than the oxygen storage component may have a BET specific surface area of 30 $m^2/g$ to 600 m/g.

As used herein, the term "inorganic oxide other than the oxygen storage component" encompasses inorganic oxides that are modify with the oxygen storage component or load the oxygen storage component. For example, the inner surface of pores and the outer surface of alumina or the like may be modified with $CeO_2$. As used herein, the term "modify" encompasses a loaded state, and specifically, a state in which fine particles of an oxygen storage component are dispersed on the inner surface of pores and the outer surface of alumina or the like. Alumina may be modified with lanthanum oxide, $ZrO_2$, or the like.

In the exhaust gas purifying catalyst according to the present invention, the amount of an inorganic oxide other than the oxygen storage component contained in the first section 14 is preferably 5 mass % or more and 80 mass % or less, and more preferably 10 mass % or more and 60 mass % or less, in view of further enhancing the exhaust gas purification performance. Also, the amount of an inorganic oxide other than the oxygen storage component contained in the second section 15 or the third section 16 is preferably within the same range as that described above for the first section 14.

In the exhaust gas purifying catalyst according to the present invention, one or more of the first section 14, the second section 15, and the optional third section 16 may contain an alkaline earth metal compound in view of heat resistance. Preferred alkaline earth metals include strontium (Sr) and/or barium (Ba). The alkaline earth metal compound may be a nitrate, a carbonate, or an oxide.

In the case where the first section 14 contains an alkaline earth metal compound, the amount of the alkaline earth metal compound in the first section 14 in terms of alkaline earth metal is preferably 1 mass % or more and 25 mass % or less, and more preferably 3 mass % or more and 20 mass % or less, in view of further enhancing the exhaust gas purification performance. Also, in the case where the second section 15 or the third section 16 contains an alkaline earth metal compound, the amount of the alkaline earth metal compound in the second section 15 or the third section 16 is preferably within the same range as that described above for the first section 14.

In the first section 14 and the second section 15, and the third section 16 if applicable, the catalytically active component is preferably loaded by an OSC material and an inorganic oxide described above. In some cases, the catalytically active component is preferably further loaded by an OSC material other than $CeO_2$—$ZrO_2$ and an alkaline earth metal compound described above.

The term "A loaded on B" herein refers to a state of particle A being physically or chemically adsorbed or held on the outer surface of a particle B, or the inner surface of pores of a particle B. Specifically, whether the state of particle B having particle A loaded thereon can be confirmed by measuring the particle sizes for example in SEM (scanning electron microscope). For example, the average particle size of particle A present on the surface of particle B is preferably 10% or less, more preferably 3% or less, and even more preferably 1% or less based on the average particle size of particle B. As used herein, the term "average particle size" refers to the average value of maximum Feret diameters of 30 particles or more when observed with an SEM. The maximum Feret diameter refers to the largest distance between two parallel lines coming into contact with the particle contour.

The amount of the catalytically active component contained in the lower catalyst layer 12 is preferably 15 g or less per liter of the porous substrate 11, and more preferably 0.05 g/L or more and 12 g/L or less, in view of obtaining a well-balanced purification effect on $NO_x$, CO, and HC while reducing the amount of the catalytically active component. Also, a preferred range of the amount of the specific element per volume of the porous substrate 11 in the lower catalyst layer 12 may be the same range as the preferred range of the amount of the catalytically active component described above.

The ratio of the length of the second section 15 in the exhaust gas flow direction X to that of the first section 14 in the exhaust gas flow direction X is preferably 0.5 or more and 6 or less, in view of achieving both the dispersibility of the catalytically active component and the exhaust gas purification performance during start-up of the engine. More preferably, the ratio is 1 or more and 4 or less.

The total length of the first section 14 and the second section 15 in the exhaust gas flow direction X is preferably 20% or more, and more preferably 30% or more based on the length of the porous substrate 11 in the exhaust gas flow direction X.

In the case where the lower catalyst layer 12 includes the third section 16, the ratio of the length of the third section 16 in the exhaust gas flow direction X to the total length of the first section 14 and the second section 15 in the exhaust gas flow direction X, is preferably 4 or less, and more preferably 2.5 or less, in view of the exhaust gas purification performance during start-up of the engine.

The lengths of the first section 14, the second section 15, and the third section 16 in the exhaust gas flow direction X can be determined using the following method.

First, a catalyst 10 as is usually has a size that is difficult to measure with an apparatus described later. Accordingly, the catalyst 10 is cut to obtain a cylindrical catalyst sample with a diameter of 20 to 30 mm. On this occasion, the catalyst 10 is cut so that the resulting cylindrical catalyst sample has a length corresponding to the entire length of the catalyst 10 in the lengthwise direction of the catalyst 10 and a central axis matching the lengthwise direction of the catalyst 10. By cross sections perpendicular to the central axis, the cylindrical catalyst sample is equally divided into 20 pieces along the central axis from the upstream end to the downstream end of the catalyst 10, to thereby obtain 20 test pieces. Each of the 20 test pieces is analyzed in terms of weight, volume, and composition, and then the specific element concentration (g/L) is calculated. The specific element concentration of each test piece can be determined using, for example, an X-ray fluorescence (XRF) analyzer or an ICP atomic emission spectrometer (ICP-AES).

Figure 4:
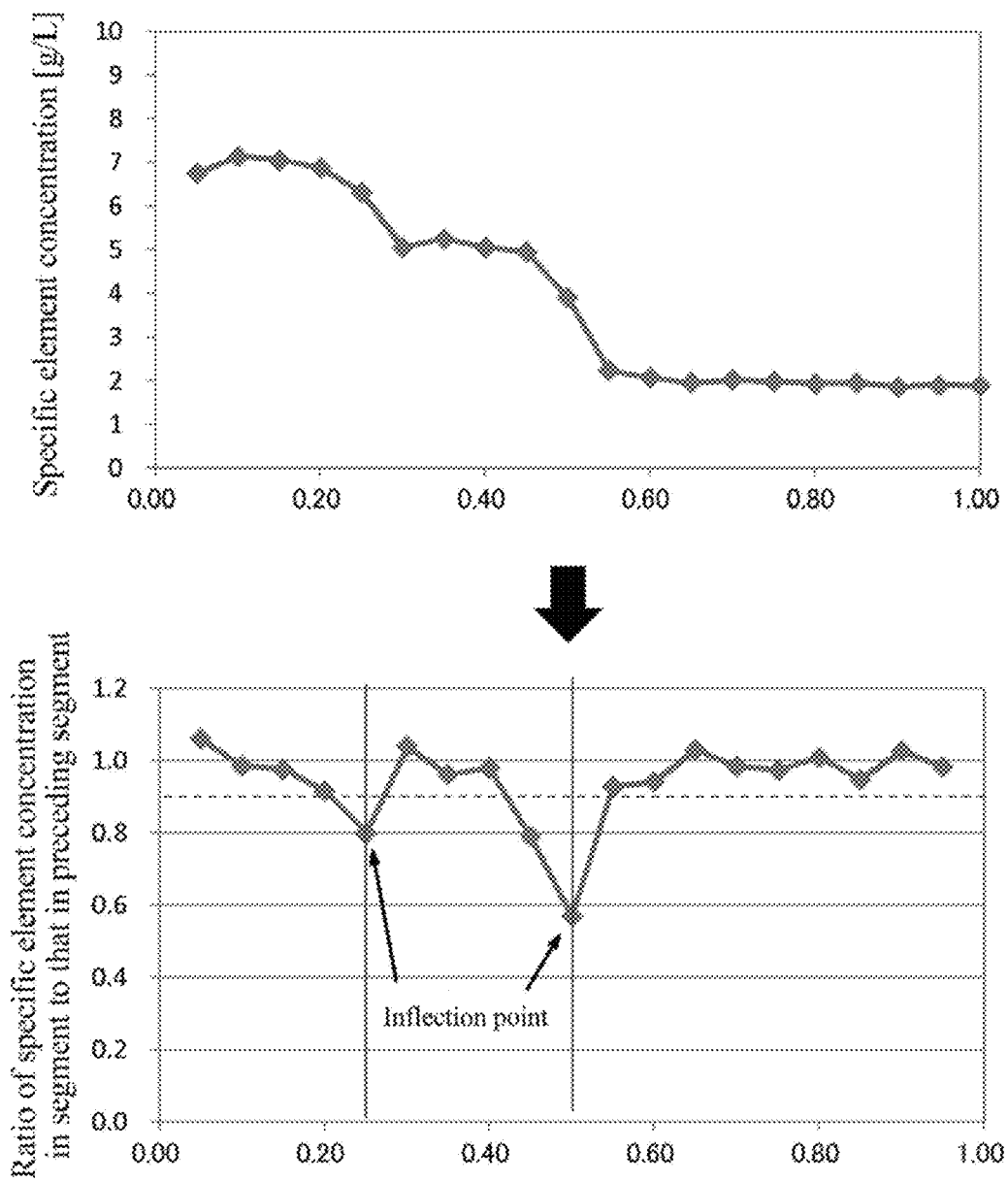
FIG. 4 shows an example of graphs showing changes in the specific element concentration in the exhaust gas flow direction X, the graphs being obtained through sampling a gas purifying catalyst and created for determining an inflection point therefrom.

Next, the lengths of the first section 14, the second section 15 and the third section 16 can be determined from the results of analysis performed on the test pieces using, for example, a method as shown in FIG. 4. Specifically, from the results of analysis performed on the test pieces, the specific element concentration is determined for each segment obtained by dividing the length from the upstream end to the downstream end of the catalyst 10 into 20 segments (the graph on the upper side of FIG. 4). After that, the ratio of the specific element concentration in one segment to that in the preceding segment just before is determined (i.e., the concentration ratio between two adjacent segments is determined), and then, a graph of the concentration ratio between segments is plotted, in which the horizontal axis indicates the position of each segment on the central axis of the sample (the graph on the lower side of FIG. 4). In the graphs on the upper and lower sides of FIG. 4, the upstream end and the downstream end of the catalyst 10 corresponds to 0.00 and 1.00, respectively, on the horizontal axis. When there is an inflection point with a concentration ratio of 0.9 or less in the graph, the inflection point is defined as the boundary between sections, and the position and length of each of the first section 14, the second section 15, and the third section 16 in the exhaust gas flow direction X of the catalyst 10 are thus specified. As used herein, the term "inflection point" means a point at which the concentration ratio is smaller than the concentration ratio of the segment that comes before that point and is also smaller than the concentration ratio of the segment that comes after that point. The graphs shown in FIG. 4 merely show an example of the results of measurement on the catalyst 10, and thus the graphs are not intended to limit the scope of the present invention.

For example, 10 or more cylindrical samples may be prepared, followed by determining the lengths of the sections for each sample using the above-described method, and L1, L2, and L3 can each be obtained by averaging the results of measurement on the samples.

Next, a preferred configuration of the upper catalyst layer 13 formed on the surface of the lower catalyst layer 12 in the example shown in FIGS. 2 and 3 will be described.

The upper catalyst layer 13 preferably contains a catalytically active component in view of obtaining an even greater exhaust gas purification effect. More preferably, the upper catalyst layer 13 contains a catalytically active component that is different from the specific element contained in the lower catalyst layer 12. Even more preferably, the upper catalyst layer 13 contains rhodium (Rh). It is particularly preferable that the specific element be platinum (Pt) or palladium (Pd) while the upper catalyst layer 13 contains rhodium (Rh), in view of a purification effect on $NO_x$, CO, and HC with a good balance and a high $NO_x$ purification effect. It is most preferable that the specific element be palladium (Pd) while the upper catalyst layer 13 contains rhodium (Rh). Although palladium is susceptible to phosphorus poisoning, phosphorus poisoning of palladium is suppressed when rhodium is contained in the upper layer. In the case where the upper catalyst layer 13 contains rhodium (Rh), the upper catalyst layer 13 may further contain Pt and/or Pd.

The amount of the catalytically active component contained in the upper catalyst layer 13 is preferably 0.05 to 5 g, and more preferably 0.1 to 3 g per liter of the porous substrate 11, in view of obtaining a well-balanced purification effect on $NO_x$, CO, and HC.

It is preferable that the upper catalyst layer 13 further contain a support component that loads the catalytically active component, in view of efficiently exhibiting the exhaust gas purification performance of the catalytically active component. As the support component used here, a $ZrO_2$-based material and an inorganic oxide other than the OSC component described above for the lower catalyst layer 12 can be used.

The $ZrO_2$-based material is a material mainly containing $ZrO_2$ and may also contain Y, La, Ce, Pr, Nd, Sm, Gd, Yb, Mg, Ca, Sr, Ba, or the like as an additive.

The inorganic oxide is preferably an inorganic oxide containing mainly $Al_2O_3$ and also containing Y, Zr, La, Ce, Pr, Nd, Sm, Gd, Yb, Mg, Ca, Sr, Ba, or the like as an additive.

The amount of $ZrO_2$ contained in the upper catalyst layer 13 is preferably 20 mass % or more and 90 mass % or less, and more preferably 30 mass % or more and 70 mass % or less, in view of the performance of the catalytically active component.

Although the relationship between the thickness of the lower catalyst layer 12 and the thickness of the upper catalyst layer 13 depends on the application of the exhaust gas purifying catalyst, the ratio of the thickness of the upper catalyst layer 13 to the thickness of the lower catalyst layer 12 is preferably 0.1 to 2.0, and more preferably 0.6 to 1.5. When the ratio of the thickness of the upper catalyst layer 13 to that of the lower catalyst layer 12 is 0.1 or more, it is possible to prevent aggregation of the catalytically active component caused by heat from the upper catalyst layer 13. Also, when the ratio of the thickness of the upper catalyst layer 13 to that of the lower catalyst layer 12 is 2.0 or less, the exhaust gas can be sufficiently diffused into the lower catalyst layer. Here, in the case where the first section 14 and the second section 15 have different thicknesses, the average value of the thicknesses of the first section 14 and the second section 15 is defined as the thickness of the lower catalyst layer 12.

In view of improving the exhaust gas purification performance with a reduced amount of noble metals, the mass ratio between the lower catalyst layer 12 and the upper catalyst layer 13 is such that the amount of the upper catalyst layer 13 is preferably 10 parts by mass or more and 200 parts by mass or less, more preferably 20 parts by mass or more and 150 parts by mass or less, and even more preferably 30 parts by mass or more and 100 parts by mass or less, relative to 100 parts by mass of the lower catalyst layer 12.

In the case where the exhaust gas purifying catalyst includes an upper catalyst layer 13, the upper catalyst layer 13 is preferably formed on a surface of the lower catalyst layer 12 that is on the other side than the porous substrate side as shown in FIG. 2, in view of exhaust gas purification performance in low temperatures. In view of further enhancing the exhaust gas purification performance, the upper catalyst layer 13 is preferably present in an area covering 50% or more, and more preferably 80% or more, of the area where the lower catalyst layer 12 is present, in the exhaust gas flow direction X, and the upper catalyst layer 13 is most preferably present on the entire area of the lower catalyst layer 12.

The upper catalyst layer 13 may extend beyond the lower catalyst layer 12 on the downstream side in the exhaust gas flow direction X. In the case where the upper catalyst layer 13 extends beyond the lower catalyst layer 12 on the downstream side in the exhaust gas flow direction X, the extension length is preferably 20% or less, and more preferably 10% or less based on the total length of the lower catalyst layer 12 in the exhaust gas flow direction X.

Likewise, the upper catalyst layer 13 may extend beyond the lower catalyst layer 12 on the upstream side in the exhaust gas flow direction X. In the case where the upper catalyst layer 13 extends beyond the lower catalyst layer 12 on the upstream side in the exhaust gas flow direction X, the extension length is preferably 10% or less, and more preferably 5% or less based on the total length of the lower catalyst layer 12 in the exhaust gas flow direction X.

The lengths of the upper catalyst layer 13 and lower catalyst layer 12 can be obtained by, for example, the same method as for determining the lengths of the sections described above, in the case where the two catalyst layers can be distinguished by different catalytically active components. Specifically, the length can be determined by preparing a cylindrical catalyst sample, equally dividing the cylindrical catalyst sample into 20 segments, and measuring the amount of the catalytically active component in each segment.

In the present invention, the amounts of various components described above, such as ceria and zirconia as well as an inorganic oxide other than the oxygen storage component, can be determined by dissolving a catalyst layer in alkali to obtain a solution, measuring the amount of each of metals, such as cerium, zirconium, and aluminum, in the solution using ICP-AES, and combining the measurement results with analysis using SIMS or EDS. The amount of a catalytically active component per the porous substrate 11 can be obtained by, for example, measuring the amount of a noble metal in a solution obtained by dissolving the catalyst layer in alkali, using ICP-AES.

An exemplary preferred example of a method for producing an exhaust gas purifying catalyst 10 according to the present embodiment may include the following steps. Either step (1) or step (2) may be performed first. Surface enrichment process described below is the process in which the concentration of the catalytically active component is enriched on the surface side of the catalyst layer.

Step (1): applying a slurry for forming a first section 14 containing a support component, a liquid medium, and a salt of a specific element to an area in a porous substrate 11 where the first section 14 is to be formed, and then drying and calcining the coating film formed on the porous substrate 11, to thereby form a first section 14 prior to a surface enrichment process (hereinafter sometimes referred to as a precursor of the first section 14).

Step (2): applying a slurry for forming a downstream section containing a support component and a liquid medium to an area in the porous substrate 11 that is on the downstream side in the exhaust gas flow direction X relative to the area where the first section 14 is to be formed, and then drying and calcining the coating film formed on the porous substrate 11, to thereby form a catalyst layer section prior to the surface enrichment process (hereinafter also referred to as a downstream section), wherein the specific element concentration of the downstream section is lower than that of the precursor of the first section 14.

Step (3): immersing the area where the first section and the second section are to be formed, which is part or all of the porous substrate 11 that has undergone steps (1) and (2), into an aqueous solution containing a salt of a specific element, and then drying and calcining the resultant to enrich the specific element concentration on the surface side of the catalyst layer 12 in the immersed area.

Through the above-described steps, the surface-enriched first section 14 is formed, and the surface-enriched area in the downstream section corresponding to the second section 15 is also formed. Through the step of applying, drying, and calcining the slurry, the amount of specific element dispersed uniformly in the first section 14 is larger than that in the second section 15, and accordingly, when the same surface enrichment process is performed on the area where the first section 14 is to be formed and the area where the second section 15 is to be formed, the concentration gradient of specific element is milder in the first section 14 than that in the second section 15. In the case of using a slurry for forming a downstream section containing a salt of a specific element, immersing the upstream portion of the downstream section in the exhaust gas flow direction X in the aqueous solution containing the salt of the specific element, and then drying and calcining the resultant, the third section 16 having a concentration gradient of specific element milder than that of the second section 15 is formed in the downstream portion relative to the immersed area in the exhaust gas flow direction X.

More preferably, step (4) below may be additionally performed after step (3).

Step (4) of preparing a slurry for forming an upper catalyst layer 13 containing a support component, a salt of a catalytically active component, and a liquid medium, applying the slurry to the lower catalyst layer 12, and then drying and calcining the resultant, to thereby form an upper catalyst layer 13 on the surface of the lower catalyst layer 12.

The slurry for forming a downstream section does not necessarily contain a specific element. In order to allow the specific element concentration of the downstream section prior to a surface enrichment process to be lower than that of the precursor of the first section 14 prior to a surface enrichment process, the amount of the salt of the specific element relative to the support component in the slurry for forming a downstream section used in step (2) may be smaller than that in the slurry for forming a first section 14 used in step (1), for example.

As the support component contained in each slurry described above, an oxygen storage component and an inorganic compound other than the oxygen storage component described above may be used. As the liquid medium contained in each slurry described above, water may be used. As the salt of a catalytically active component such as a specific element contained in each slurry described above, for example, palladium nitrate, rhodium nitrate salt, platinum nitrate, and the like may be used.

In view of the catalytic activity of the resulting exhaust gas purifying catalyst, the temperature for calcining the slurry applied to the substrate in step (1), step (2), and step (4) is preferably 400° C. to 800° C., and more preferably 450° C. to 600° C. The calcining time is preferably 30 minutes to 6 hours, and more preferably 1 hour to 4 hours.

The slurry applied to the substrate is preferably dried before calcining. The drying temperature is preferably 40° C. to 200° C., and more preferably 70° C. to 150° C. The drying time is preferably 5 minutes to 6 hours, and more preferably 10 minutes to 2 hours.

As the aqueous solution containing a salt of a specific element in step (3) described above, an aqueous solution of a salt of a catalytically active component such as palladium nitrate, rhodium nitrate salt, or platinum nitrate may be used. The concentration of the salt of a catalytically active component in the aqueous solution is tailored to achieve the desirable amount of the catalytically active component to be loaded on the catalyst layer.

The temperature of the aqueous solution in which the substrate is immersed is preferably 0° C. or more and 90° C. or less, and more preferably 10° C. or more and 50° C. or less. The immersion time is preferably 1 hour to 72 hours, and more preferably 6 hours to 48 hours. When the substrate is immersed, the specific element diffuses from the aqueous solution containing a salt of the specific element in the cells of the porous substrate to the lower catalyst layer 12 on the cell walls, and is adsorbed to the lower catalyst layer 12. Thus, the surface of the catalyst layer is advantageous for diffusion of the specific element, and a larger amount of the specific element is distributed in the surface of the catalyst layer.

The substrate that has undergone immersion is preferably dried. The drying temperature is preferably 40° C. to 200° C., and more preferably 70° C. to 150° C. The drying time is preferably 5 minutes to 6 hours, and more preferably 10 minutes to 3 hours. Also, the calcining temperature after drying the substrate is preferably 400° C. to 800° C., and more preferably 450° C. to 600° C. The calcining time is preferably 30 minutes to 6 hours, and more preferably 1 hour to 4 hours.

The exhaust gas purifying catalyst according to the present invention produced through the steps described above, in which the amount of a catalytically active component is reduced as compared with exhaust gas purifying catalysts according to conventional technology, achieves the dispersibility of the catalytically active component and also the exhaust gas purification performance during start-up, which are difficult for conventional technology to achieve at the same time, and the exhaust gas purifying catalyst according to the present invention is also excellent in thermal durability. Accordingly, the exhaust gas purifying catalyst according to the present invention can be used as an exhaust gas purifying catalyst for an internal combustion engine that uses a gasoline engine as a power source, which is subjected to a particularly high temperature environment, and can efficiently purify $NO_x$, HC, and CO.

EXAMPLES

Hereinafter, the present invention will be described in further detail by way of examples. However, the scope of the present invention is not limited to the examples given below. Both drying and calcining steps were performed in an atmosphere. The specific surface area was determined by the BET three-point method using a specific surface area and pore size distribution analyzer (model number: QUADRASORB SI) available from Quantachrome Corporation. Helium was used as the measurement gas.

Example 1

[1. Preparation of Base Slurry for Forming Lower Catalyst Layer]

An OSC material that had the following composition and specific surface area was provided.

$CeO_2$: 30 mass %, $ZrO_2$: 58 mass %, $La_2O_3$: 8 mass %, and $Nd_2O_3$: 4 mass %, and BET specific surface area: 50 $m^2/g$ Whether $CeO_2$, $La_2O_3$, $Nd_2O_3$, and $ZrO_2$ had formed a solid solution in the OSC material was checked using the method described hereinbefore.

The OSC material, lanthanum oxide-modified alumina (amount of $La_2O_3$ for modification: 3 mass %, and BET specific surface area: 100 $m^2/g$), barium acetate, alumina sol, and water were placed in a ball mill pot, and they were mixed using a ball mill for 2 hours to thereby obtain a base slurry for forming a lower catalyst layer. The ratio between the amounts of the components in the slurry was as follows: OSC material 50 mass %, lanthanum oxide-modified alumina 30 mass %, barium carbonate 10 mass %, and alumina 10 mass %.

[2. Formation of First Section Prior to Surface Enrichment Process]

The above-described base slurry for forming a lower catalyst layer was mixed with an aqueous solution of palladium nitrate to thereby obtain a slurry for forming a first section. A portion of a cordierite honeycomb porous substrate 11 (available from NGK Insulators, Ltd.) extending from the upstream end of the substrate 11 to the position downstream thereof in the exhaust gas flow direction X with a length of 25% of the length L of the porous substrate 11 (this portion is hereinafter also referred to as "region A") was immersed in the slurry for forming a first section so as to apply the slurry to that portion of the porous substrate 11. After that, the porous substrate 11 with the slurry coating was dried at 150° C. for 2.5 hours, and then subjected to calcining at 450° C. for 2.5 hours to form a first section 14 prior to a surface enrichment process (i.e., a precursor of the first section 14). The amount of the first section 14 was 160 g per liter of the volume V1, which was the volume of the portion of the porous substrate 11 where the first section 14 was present. The amount of Pd contained in the first section 14 prior to a surface enrichment process was 3 g per liter of the volume V1.

[3. Formation of Downstream Section]

The above-described base slurry for forming a lower catalyst layer was mixed with an aqueous solution of palladium nitrate to thereby obtain a slurry for forming a downstream section. At that time, the amount of palladium nitrate in the slurry for forming a downstream section was set such that the downstream section after calcining and prior to a surface enrichment process had a Pd concentration described later. A portion of the honeycomb porous substrate 11 where the first section 14 was not to be formed (a portion of the porous substrate 11 extending from the downstream end of the substrate 11 to the position upstream thereof in the exhaust gas flow direction X with a length of 75% of the length L; this portion is hereinafter also referred to as "region B+C") was immersed in the slurry so as to apply the slurry to that portion of the porous substrate 11. After that, the porous substrate 11 with the slurry coating was dried at 150° C. for 2.5 hours, and then subjected to calcining at 450° C. for 2.5 hours to form a downstream section (a section corresponding to the second section 15 and the third section 16) prior to a surface enrichment process. There was no gap between the first section and the downstream section. The amount of the downstream section was 160 g per liter of the volume (V2+V3), which was the volume of the portion of the porous substrate 11 where the downstream section was present. The amount of Pd contained in the downstream section was 2 g per liter of the volume (V2+V3). The thickness ratio between the first section 14 and the downstream section was approximately 1:1.

[4. Loading of Pd by Surface Enrichment]

The upstream half of the porous substrate 11 after [3. Formation of Downstream Section] described above in the exhaust gas flow direction X was immersed in an aqueous solution of palladium nitrate (concentration in terms of Pd: 3.5 g/L) at 25° C. for 48 hours. After immersion, the porous substrate 11 was dried at 150° C. for 2.5 hours, and subjected to calcining at 450° C. for 2.5 hours. The amount of Pd in the first section 14 was 6.5 g per liter of the volume V1, which was the volume of the portion of the porous substrate 11 where the first section 14 was present. Also, the second section 15 was formed in a portion of the downstream section that had been immersed in the aqueous solution of palladium nitrate (region B in the substrate), and the third section 16 was formed in a portion of the downstream section that had not been immersed in the aqueous solution of palladium nitrate (region C in the substrate). The amount of Pd in the second section 15 was 5.5 g per liter of the volume V2, which was the volume of the portion of the porous substrate 11 where the second section 15 was present. The amount of Pd in the third section 16 was 2 g per liter of the volume V3, which was the volume of the portion of the porous substrate 11 where the third section 16 was present.

[5. Formation of Upper Catalyst Layer]

A $ZrO_2$-based material that had the following composition and specific surface area was provided.

$CeO_2$: 15 mass %, $ZrO_2$: 73 mass %, $La_2O_3$: 8 mass %, and $Nd_2O_3$: 4 mass %; and BET specific surface area: 50 $m^2/g$ It was checked that $CeO_2$, $ZrO_2$, $La_2O_3$, and $Nd_2O_3$ had formed a solid solution in the $ZrO_2$-based material, using the method described hereinbefore.

The $ZrO_2$-based material, lanthanum-modified alumina (amount of $La_2O_3$ for modification: 3 mass %, and BET specific surface area: 100 $m^2/g$), alumina sol, and water were placed in a ball mill pot, and they were mixed using a ball mill for 2 hours to thereby obtain a base slurry for forming an upper catalyst layer. The obtained slurry was mixed with an aqueous solution of rhodium nitrate to thereby obtain a slurry for forming an upper catalyst layer. The ratio between the amounts of the components contained in the slurry for forming an upper catalyst layer was such that the ratio between the components (excluding rhodium) contained in the upper catalyst layer 13 was 60 mass % of $ZrO_2$-based material, 30 mass % of lanthanum-modified alumina, and 10 mass % of alumina after calcining, and also such that the amount of rhodium in the upper catalyst layer 13 was 0.5 mass % after calcining.

The entire porous substrate 11 having the lower catalyst layer 12 was immersed in the slurry for forming an upper catalyst layer. After that, the porous substrate 11 with the slurry coating was dried at 150° C. for 2.5 hours, and then subjected to calcining at 450° C. for 2.5 hours to form an upper catalyst layer 13. Thus, an exhaust gas purifying catalyst 10 of Example 1 was obtained. The upper catalyst layer 13 covered the entire surface of the lower catalyst layer 12, and the area of the upper catalyst layer 13 was equal to the area of the lower catalyst layer 12.

The amount of the upper catalyst layer 13 was 60 g per liter of the volume (V1+V2+V3) of the porous substrate 11.

The amount of rhodium contained in the upper catalyst layer 13 was 0.3 g per liter of the volume (V1+V2+V3) of the porous substrate 11. The ratio of the thickness of the upper catalyst layer 13 to that of the lower catalyst layer was 0.6.

Example 2

A first section 14 prior to a surface enrichment process was formed in the same manner as in Example 1, except that the slurry for forming a first section was prepared by changing the mixing mass ratio of the above-described base slurry for forming a lower catalyst layer and the aqueous solution of palladium nitrate in [2. Formation of First Section prior to Surface Enrichment Process] of Example 1 described above. The amount of palladium contained in the first section 14 prior to a surface enrichment process was 4 g/L. After that, [3. Formation of Downstream Section] was performed in the same manner as in Example 1. Then, surface enrichment process with Pd was performed on the first section 14 and the upstream side of the downstream section in the same manner as in Example 1, except that the concentration of palladium nitrate in the aqueous solution in Example 1 was changed to 3 g/L in terms of Pd. The amount of Pd in the first section 14 was 7 g per liter of the volume V1, which was the volume of the portion of the porous substrate 11 where the first section 14 was present. Also, a second section 15 was formed in a portion of the downstream section that had been immersed in the aqueous solution of palladium nitrate, and a third section 16 was formed in a portion of the downstream section that had not been immersed in the aqueous solution of palladium nitrate. The amount of Pd in the second section 15 was 5 g per liter of the volume V2, which was the volume of the portion of the porous substrate 11 where the second section 15 was present. The amount of Pd in the third section 16 was 2 g per liter of the volume V3, which was the volume of the portion of the porous substrate 11 where the third section 16 was present. Furthermore, an upper catalyst layer 13 was then formed in the same manner as in [5. Formation of Upper Catalyst Layer] of Example 1. Thus, an exhaust gas purifying catalyst 10 was obtained.

Example 3

A first section 14 prior to a surface enrichment process was formed in the same manner as in Example 1, except that the slurry for forming a first section was prepared by changing the mixing mass ratio of the above-described base slurry for forming a lower catalyst layer and the aqueous solution of palladium nitrate in [2. Formation of First Section prior to Surface Enrichment Process] of Example 1 described above. The amount of palladium contained in the first section 14 was 6 g/L. After that, [3. Formation of Downstream Section] was performed in the same manner as in Example 1. Then, surface enrichment process with Pd was performed on the first section 14 and the upstream side of the downstream section in the same manner as in Example 1, except that the concentration of palladium nitrate in the aqueous solution in Example 1 was changed to 2 g/L in terms of Pd. The amount of Pd in the first section 14 was 8 g per liter of the volume V1, which was the volume of the portion of the porous substrate 11 where the first section 14 was present. Also, a second section 15 was formed in a portion of the downstream section that had been immersed in the aqueous solution of palladium nitrate, and a third section 16 was formed in a portion of the downstream section that was had not been immersed in the aqueous solution of palladium nitrate. The amount of Pd in the second section 15 was 4 g per liter of the volume V2, which was the volume of the portion of the porous substrate 11 where the second section 15 was present. The amount of Pd in the third section 16 was 2 g per liter of the volume V3, which was the volume of the portion of the porous substrate 11 where the third section 16 was present. Furthermore, an upper catalyst layer 13 was then formed in the same manner as in [5. Formation of Upper Catalyst Layer] of Example 1. Thus, an exhaust gas purifying catalyst 10 was obtained.

Example 4

A first section 14 prior to a surface enrichment process was formed in the same manner as in Example 1, except that the slurry for forming a first section was prepared by changing the mixing mass ratio of the above-described base slurry for forming a lower catalyst layer and the aqueous solution of palladium nitrate in [2. Formation of First Section prior to Surface Enrichment Process] of Example 1 described above. The amount of palladium contained in the first section 14 was 2 g/L. After that, a downstream section prior to a surface enrichment process was obtained in the same manner as in Example 1, except that the slurry for forming a downstream section was prepared by changing the mixing mass ratio of the base slurry for forming a lower catalyst layer and the aqueous solution of palladium nitrate in [3. Formation of Downstream Section]. The amount of Pd contained in the downstream section was 1 g per liter of the volume (V2+V3), which was the volume of the portion of the porous substrate 11 where the downstream section was present. Next, surface enrichment process with Pd was performed on the first section 14 and the upstream side of the downstream section in the same manner as in [4. Loading of Pd by Surface Enrichment] of Example 1, except that the concentration of palladium nitrate in the aqueous solution was changed to 5.5 g/L in terms of Pd. The amount of Pd in the first section 14 was 7.5 g per liter of the volume V1, which was the volume of the portion of the porous substrate 11 where the first section 14 was present. Also, a second section 15 was formed in a portion of the downstream section that had been immersed in the aqueous solution of palladium nitrate, and a third section 16 was formed in a portion of the downstream section that had not been immersed in the aqueous solution of palladium nitrate. The amount of Pd in the second section 15 was 6.5 g per liter of the volume V2, which was the volume of the portion of the porous substrate 11 where the second section 15 was present. The amount of Pd in the third section 16 was 1 g per liter of the volume V3, which was the volume of the portion of the porous substrate 11 where the third section 16 was present. Furthermore, an upper catalyst layer 13 was formed in the same manner as in [5. Formation of Upper Catalyst Layer of Example 1]. Thus, an exhaust gas purifying catalyst 10 was obtained.

Example 5

A first section 14 prior to a surface enrichment process was formed in the same manner as in Example 1, except that the slurry for forming a first section was prepared by changing the mixing mass ratio of the above-described base slurry for forming a lower catalyst layer and the aqueous solution of palladium nitrate in [2. Formation of First Section prior to Surface Enrichment Process] of Example 1 described above. The amount of palladium contained in the first section 14 was 3 g/L. After that, a downstream section prior to a surface enrichment process was obtained in the same manner as in Example 1, except that the slurry for forming a downstream section was prepared by changing the mixing mass ratio of the base slurry for forming a lower catalyst layer and the aqueous solution of palladium nitrate in [3. Formation of Downstream Section] of Example 1. The amount of Pd contained in the downstream section was 1 g per liter of to the volume (V2+V3), which was the volume of the portion of the porous substrate 11 where the downstream section was present. Next, surface enrichment process with Pd was performed on the first section 14 and the upstream side of the downstream section in the same manner as in [4. Loading of Pd by Surface Enrichment] of Example 1, except that the concentration of palladium nitrate in the aqueous solution in Example 1 was changed to 5 g/L in terms of Pd. The amount of Pd in the first section 14 was 8 g per liter of the volume V1, which was the volume of the portion of the porous substrate 11 where the first section 14 was present. Also, a second section 15 was formed in a portion of the downstream section that had been immersed in the aqueous solution of palladium nitrate, and a third section 16 was formed in a portion of the downstream section that had not been immersed in the aqueous solution of palladium nitrate. The amount of Pd in the second section 15 was 6 g per liter of the volume V2, which was the volume of the portion of the porous substrate 11 where the second section 15 was present. The amount of Pd in the third section 16 was 1 g per liter of the volume V3, which was the volume of the portion of the porous substrate 11 where the third section 16 was present. Furthermore, an upper catalyst layer 13 was formed in the same manner as in [5. Formation of Upper Catalyst Layer] of Example 1. Thus, an exhaust gas purifying catalyst 10 was obtained.

Comparative Example 1

The upstream half (a portion corresponding to the first section and the second section of Example 1) of the porous substrate 11 in the exhaust gas flow direction X was immersed in the slurry for forming a first section obtained in [2. Formation of First Section prior to Surface Enrichment Process] of Example 3, and then the substrate with the slurry coating was dried and subjected to calcining in the same manner as in Example 3, to thereby form a section in which palladium was dispersed uniformly. The amount of this section was 160 g per liter the volume (V1+V2), which was the volume of the portion of the porous substrate 11 where this section was present. The amount of palladium in this upstream section was 6 g per liter of the volume (V1+V2). Next, the downstream half (a portion corresponding to the third section in Example 1) of the porous substrate 11 in the exhaust gas flow direction X was immersed in the slurry for forming a downstream section obtained in [3. Formation of Downstream Section] of Example 3, and then the substrate with the slurry coating was dried and subjected to calcining in the same manner as in Example 3, to thereby form a downstream section in which palladium was uniformly dispersed. The amount of this section was 160 g per liter of the volume V3, which was the volume of the portion of the porous substrate 11 where this section was present. The amount of Pd contained in this section was 2 g per liter of the volume V3.

After that, [5. Formation of Upper Catalyst Layer] was performed without performing [4. Loading of Pd by Surface Enrichment] of Example 3. Thus, an exhaust gas purifying catalyst 10 was obtained.

Comparative Example 2

The upstream half (a portion corresponding to the first section and the second section in Example 1) of the porous substrate 11 in the exhaust gas flow direction X was immersed in the base slurry for forming a lower catalyst layer obtained in [1. Preparation of Base Slurry for Forming Lower Catalyst Layer] of Example 3, and then the substrate with the slurry coating was dried and subjected to calcining in the same manner as in Example 3, to thereby form a catalytically active component-free section prior to a surface enrichment process. The amount of the section was 160 g per liter of the volume (V1+V2), which was the volume of the portion of the porous substrate 11 where this section was present.

Next, the downstream half of the porous substrate 11 in the exhaust gas flow direction X was immersed in the slurry for forming a downstream section obtained in [3. Formation of Downstream Section] of Example 3, and then the substrate with the slurry coating was dried and subjected to calcining in the same manner as in Example 3, to thereby form a downstream section (a portion corresponding to the third section 16 in Example 1) in which palladium was uniformly dispersed. The amount of this section was 160 g per liter of the volume V3, which was the volume of the portion of the porous substrate 11 where this section was present. The amount of Pd contained in this section was 2 g per liter of the volume V3.

For the porous substrate 11 having the lower catalyst layer, surface enrichment process with Pd was performed on the catalyst layer formed on the upstream half of the porous substrate 11 in the exhaust gas flow direction X in the same manner as in [4. Loading of Pd by Surface Enrichment] of Example 1, except that the concentration of palladium nitrate in the aqueous solution was changed to 6 g/L in terms of Pd. The amount of Pd in the portion of the lower catalyst layer 12 that had undergone the Pd enrichment process (a portion corresponding to the first section 14 and the second section 15 in Example 1) was 6 g per liter of the volume (V1+V2), which was the volume of the portion of the porous substrate 11 where the upstream section was present. Also, the amount of Pd in the portion of the lower catalyst layer 12 that had not been immersed in the aqueous solution of palladium nitrate (a portion corresponding to the third section 16 in Example 1) was 2 g per liter of the volume of a portion of the porous substrate 11 where this non-immersed portion was present.

Furthermore, an upper catalyst layer 13 was formed in the same manner as in [5. Formation of Upper Catalyst Layer] of Example 1. Thus, an exhaust gas purifying catalyst 10 was obtained.

Comparative Example 3

A slurry for forming a first section was prepared by changing the mixing ratio of the base slurry for forming a lower catalyst layer obtained in [1. Preparation of Base Slurry for Forming Lower Catalyst Layer] of Example 1 and the aqueous solution of palladium nitrate from the mixing ratio used in Example 1. A portion of the porous substrate 11 extending from the upstream end of the substrate 11 in the exhaust gas flow direction X to the position downstream thereof with a length of 25% of the length L of the substrate 11 was immersed in the slurry. Then, the substrate with the slurry coating was dried and subjected to calcining in the same manner as in Example 3, to thereby form a first section 14 in which palladium was uniformly dispersed. The amount of the first section 14 was 160 g per liter of the volume V1, which was the volume of the portion of the porous substrate 11 where the first section 14 was present. The amount of palladium in the first section 14 was 10 g per liter of the volume V1.

Next, a portion of the porous substrate 11 extending from the downstream end of the substrate to the position upstream thereof in the exhaust gas flow direction X with a length of 75% of the length L (a portion corresponding to the second section 15 and the third section 16 in Example 1) was immersed in the slurry for forming a downstream section obtained in [2. Formation of First Section] of Example 3, and then the substrate with the slurry coating was dried and subjected to calcining in the same manner as in Example 3, to thereby form a downstream section in which palladium was uniformly dispersed. The amount of this section was 160 g per liter of the volume (V2+V3), which was the volume of the portion of the porous substrate 11 where this section was present. The amount of Pd contained in the section was 2 g per liter of the volume (V2+V3).

After that, [5. Formation of Upper Catalyst Layer] was performed without performing [4. Loading of Pd by Surface Enrichment] of Example 3. Thus, an exhaust gas purifying catalyst 10 was obtained.

Comparative Example 4

A portion of the porous substrate 11 extending from the upstream end thereof in the exhaust gas flow direction X with a length of 25% of the length of the substrate 11 was immersed in the base slurry for forming a lower catalyst layer obtained in [1. Preparation of Base Slurry for Forming Lower Catalyst Layer] of Example 3, and then the substrate with the slurry coating was dried and subjected to calcining in the same manner as in Example 3, to thereby form a catalytically active component-free portion corresponding to a first section 14 prior to a surface enrichment process. The amount of the portion corresponding to the first section 14 was 160 g per liter of the volume V1, which was the volume of the portion of the porous substrate 11 where the first section 14 was present.

Next, a portion of the substrate 11 extending from the downstream end of the substrate to the position upstream thereof in the exhaust gas flow direction X with a length of 75% of the length L of the substrate 11 (a portion corresponding to the second section 15 and the third section 16 in Example 1) was immersed in the slurry for forming a downstream section obtained in [3. Formation of Downstream Section] of Example 3, and then the substrate with the slurry coating was dried and subjected to calcining in the same manner as in Example 3, to thereby form a downstream section in which palladium was uniformly dispersed. The amount of the downstream section was 160 g per liter of the volume (V2+V3), which was the volume of the portion of the porous substrate 11 where the downstream section was present. The amount of Pd contained in the downstream section was 2 g per liter of the volume (V2+V3).

For the porous substrate 11 having the lower catalyst layer 12, surface enrichment process with Pd was performed on a portion of the lower catalyst layer 12 extending from its upstream end in the exhaust gas flow direction X with a length of 25% of the length thereof in the same manner as in [4. Loading of Pd by Surface Enrichment] of Example 1, except that the concentration of palladium nitrate in the aqueous solution in Example 1 was changed to 10 g/L in terms of Pd. The amount of Pd in the portion of the lower catalyst layer 12 that had undergone the Pd enrichment process was 10 g per liter of the volume V1, which was the volume of the portion of the porous substrate 11 corresponding to the first section 14. The amount of Pd in the portion of the lower catalyst layer 12 that had not been immersed in the aqueous solution of palladium nitrate was 2 g per liter of the volume (V2+V3), which was the volume of the portion of the porous substrate 11 where the non-immersed portion was present.

Furthermore, an upper catalyst layer 13 was formed in the same manner as in [5. Formation of Upper Catalyst Layer] of Example 1. Thus, an exhaust gas purifying catalyst 10 was obtained.

The concentration gradients a1/a2 and b1/b2 were measured using the method described hereinbefore for each of the exhaust gas purifying catalysts of Examples 1 to 5 and Comparative Examples 1 to 4. As the EDX, XM-8101 available from JEOL Ltd. was used. The results are shown in Table 1. Also, fluctuation curves obtained through line analysis performed on the first section and the second section of Example 2 are shown in FIG. 5.

The exhaust gas purifying catalysts of Examples 1 to 3 and Comparative Examples 1 to 4 were exposed to the following degradation conditions for a durability test comparable to driving 50,000 to 100,000 kilometers.

Specifically, while an exhaust gas discharged by running an engine under the following conditions was brought into contact with an exhaust gas purifying catalyst, the catalyst temperature was maintained at a temperature described below for the following time.

Degradation Conditions

Engine used for durability test: 2 L NA gasoline engine for passenger vehicles

Gasoline used: commercially available regular gasoline

Temperature and time used for degradation: 900° C., 100 hrs.

Changes in air-to-fuel ratio in preceding stage of catalyst: A/F=13.5 (10 sec)→15.5 (20 sec)→13.5 (10 sec), this cycle was repeated.

Determination of T50 and η500

A temperature controller and an exhaust gas purifying catalyst that had been exposed to the degradation conditions were disposed in this order downstream of an engine, which will be described below, via an exhaust pipe. The gas temperature of exhaust gas flowing into the exhaust gas purifying catalyst was increased gradually from room temperature. The amount of HC contained in the exhaust gas that had passed through the catalyst was measured using the following apparatus, and the HC purification rate was calculated using the following equation. The results are shown in Table 1 and FIG. 6.

$$HC \text{ purification rate } (\%) = (A-B)/A \times 100$$

wherein A represents the amount of HC detected before the catalyst was disposed, and B represents the amount of HC detected after the catalyst was disposed.

The gas temperature of the catalyst when the HC purification rate reached 50% was defined as light-off temperature T50. Determination of T50 was performed under the condition of each of a temperature increase rate of 30° C./min and a temperature increase rate of 400° C./min.

Also, η500 was determined. η500 is the HC purification rate determined in the same manner as for the determination of T50, except that the temperature of the exhaust gas flowing into the apparatus is kept at 500° C.

Engine used for evaluation: 2 L NA gasoline engine for passenger vehicles
Gasoline used: fuel for verification test
Air-to-fuel ratio in preceding stage of catalyst: A/F=14.6
Rate of temperature increase: at 30° C./min from 100° C. to 500° C., and 400° C./min from 100° C. to 500° C.
SV=100,000/h
Measurement of total amount of hydrocarbon (THC): an FID detector available from Horiba, Ltd.

temperature of the entire catalyst rises uniformly at a rate of temperature increase of 30° C./min, and thus T50 under the condition of a temperature increase rate of 30° C./min indicates the dispersibility of the catalytically active component in the entire catalyst and thermal durability resulting therefrom. Likewise, the purification rate η500 at 500° C. indicates the dispersibility of the catalytically active component in the entire catalyst and thermal durability resulting therefrom.

TABLE 1

| | Amount of Pd Loaded [g/L] (per volume of applied portion) | | | | | | Relationship between Regions A to C and First to Third Sections | | |
|---|---|---|---|---|---|---|---|---|---|
| | Region A (L 25%) | | Region B (L 25%) | | Region C (L 50%) | | | | |
| | Uniform loading | Surface enrichment | Uniform loading | Surface enrichment | Uniform loading | Surface enrichment | First section | Second section | Third section |
| Comp. Ex. 1 | 6 | | 6 | | 2 | | A + B | C | — |
| Comp. Ex. 2 | | 6 | | 6 | 2 | | A + B | C | — |
| Comp. Ex. 3 | 10 | | 2 | | 2 | | A | B + C | — |
| Comp. Ex. 4 | | 10 | 2 | | 2 | | A | B + C | — |
| Ex. 1 | 3 | 3.5 | 2 | 3.5 | 2 | | A | B | C |
| Ex. 2 | 4 | 3 | 2 | 3 | 2 | | A | B | C |
| Ex. 3 | 6 | 2 | 2 | 2 | 2 | | A | B | C |
| Ex. 4 | 2 | 5.5 | 1 | 5.5 | 1 | | A | B | C |
| Ex. 5 | 3 | 5 | 1 | 5 | 1 | | A | B | C |

| | Gradient of Pd Concentration in Thickness Direction | | | | Gradient of Pd Concentration in Flow Direction a3/b3 | Evaluation | | |
|---|---|---|---|---|---|---|---|---|
| | First section a1/a2 | Second section b1/b2 | Third section c1/c2 | (a1/a2)/(b1/b2) | | Aged T50 at low temperature increase rate Aged T50 (° C.) 30° C./min | Aged T50 at high temperature increase rate Aged T50 (° C.) 400° C./min | Aged purification rate η500[%] |
| Comp. Ex. 1 | 1.03 | 1.01 | — | 1.01 | 3.0 | 298.6 | 378.6 | 94.5 |
| Comp. Ex. 2 | 2.25 | 1.02 | — | 2.20 | 3.0 | 303.2 | 369.9 | 95.4 |
| Comp. Ex. 3 | 1.11 | 1.00 | — | 1.11 | 5.0 | 304.3 | 362.0 | 93.8 |
| Comp. Ex. 4 | 1.87 | 1.01 | — | 1.86 | 5.0 | 311.1 | 354.1 | 92.8 |
| Ex. 1 | 1.54 | 1.81 | 1.00 | 0.85 | 1.2 | 297.8 | 359.2 | 96.6 |
| Ex. 2 | 1.29 | 1.54 | 1.00 | 0.84 | 1.4 | 298.4 | 357.4 | 95.4 |
| Ex. 3 | 1.13 | 1.36 | 1.00 | 0.83 | 2.0 | 300.5 | 356.2 | 94.9 |
| Ex. 4 | 2.12 | 2.39 | 1.00 | 0.89 | 1.2 | 297.1 | 355.1 | 96.7 |
| Ex. 5 | 1.83 | 2.32 | 1.00 | 0.79 | 1.3 | 298.3 | 353.8 | 96.4 |

Figure 6:
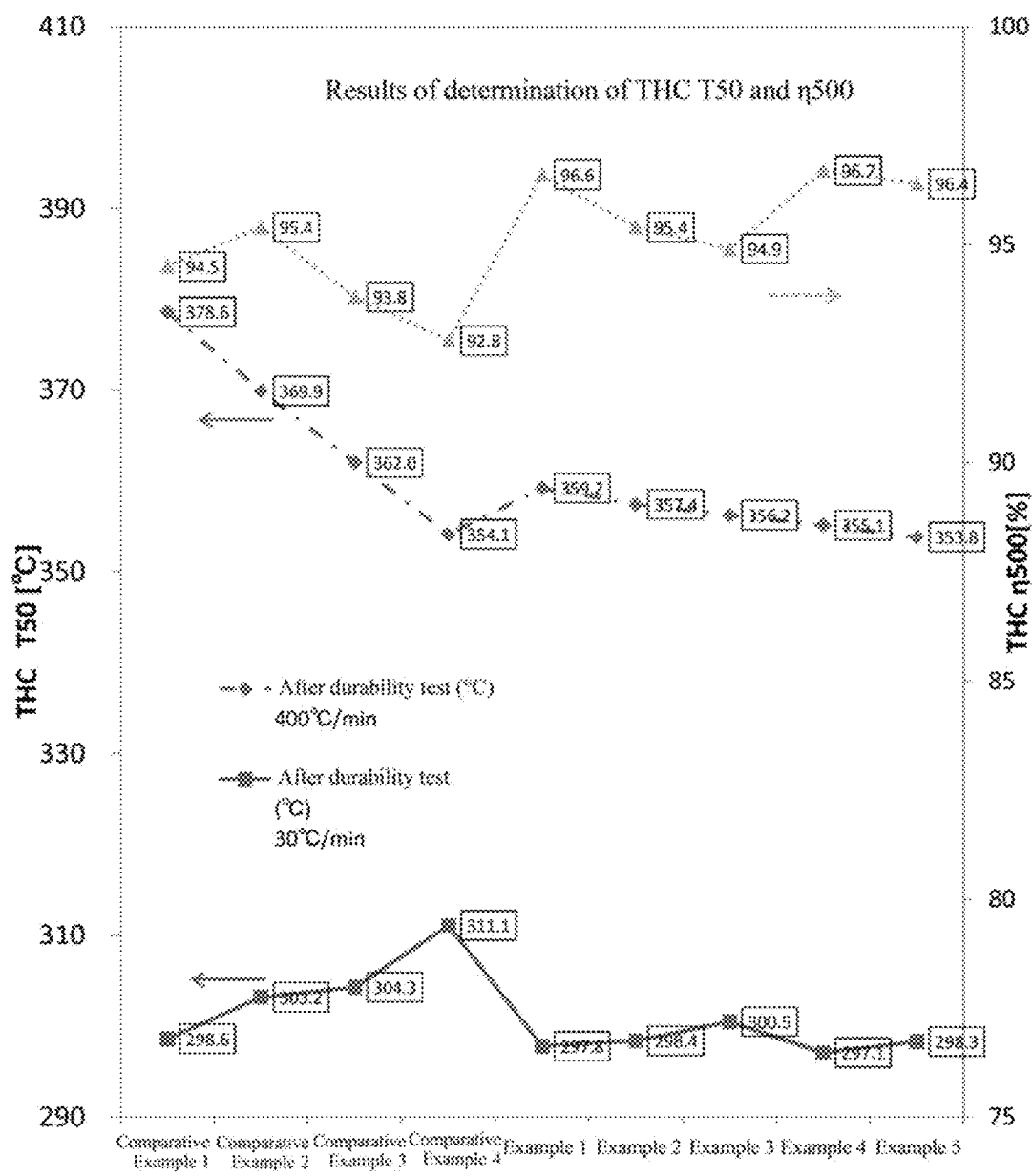
FIG. 6 is a graph in which T50 at a fast temperature increase rate, T50 at a slow temperature increase rate, and purification rates at 500° C. in Examples and Comparative Examples are plotted.

In FIG. 6, a lower value of T50 indicates higher exhaust gas purification performance, and a higher value of η500 indicates higher exhaust gas purification performance. In FIG. 6, a rate of temperature increase of 400° C./min is close to a rate of temperature increase of exhaust gas during engine start-up of an actual vehicle, and thus the results at that rate indicates the exhaust gas purification performance during engine start-up. The temperature easily rises on the upstream side in the exhaust gas flow direction X and/or on the surface layer side of the catalyst when the rate of temperature increase is high. A lower value of T50 under the condition of a temperature increase rate of 400° C./min indicates that the exhaust gas purification performance is highly active in portion on the upstream side in the exhaust gas flow direction X and/or on the surface layer side. The In Examples and Comparative Examples, the total amount of catalytically active components used in the catalyst was the same.

In Examples, T50 at a rate of temperature increase of 400° C./min was 359.2° C. or less, which means about the same or a higher performance level as compared with Comparative Examples 3 and 4. In addition, thermal durability was improved; specifically, T50 at a rate of temperature increase of 30° C./min was as low as 300.5° C. or less, and the purification rate η500 at 500° C. was as high as 94.9% or more.

In contrast, as shown in FIG. 6, there was a tendency for T50 at a rate of temperature increase of 400° C./min to be gradually improved in Comparative Examples 1, 2, 3, and 4 in this order; however, there was a tendency for T50 at a rate of temperature increase of 30° C./min and η500, which require thermal resistance, to be gradually degraded overall in Comparative Examples 1, 2, 3, and 4 in this order.

Specifically, in Comparative Example 1, T50 at the low rate of temperature increase and η500 were about the same level or less as compared with those in Examples, but T50 at the high rate of temperature increase was extremely high. Thus, the exhaust gas purification performance during engine start-up was extremely poor, as compared with that in Examples.

In Comparative Example 2, η500 was about the same level or less as compared with those of Examples. However, the amount of Pd contained in the upstream region A was insufficient, and thus T50 at the high rate of temperature increase was significantly high. Also, as a result of excessive enrichment of the vicinity of the surface layer with Pd, sintering of Pd occurred, and thus T50 at the low rate of temperature increase was also high. Accordingly, the exhaust gas purification performance during engine start-up was significantly poor, as compared with that in Examples.

In Comparative Examples 3 and 4, 1500 was low, and T50 at the low rate of temperature increase was high, as compared with those in Examples. Accordingly, the exhaust gas purification performance during engine start-up was poor as compared with that in Examples, and the dispersibility of the catalytically active component and thermal resistance resulting therefrom were also poor.

It can be seen from the foregoing that the present invention provides an exhaust gas purifying catalyst that achieves the exhaust gas purification performance during engine start-up, as well as the dispersibility of the catalytically active component and the thermal resistance resulting therefrom.

INDUSTRIAL APPLICABILITY

According to the present invention, there is provided an exhaust gas purifying catalyst that achieves a reduction in the amount of noble metals and also delivers excellent exhaust gas purification performance during engine start-up even after exposing conditions in which thermal durability is required.

The invention claimed is:

1. An exhaust gas purifying catalyst comprising a first catalyst layer including a first section and a second section in an exhaust gas flow direction, the first section being located on an upstream side in the exhaust gas flow direction relative to the second section,
   wherein the first section and the second section both contain a catalytically active component including a specific element,
   a concentration of the specific element is higher in the first section than in the second section,
   a concentration gradient of the specific element contained in the first section in a thickness direction of the first catalyst layer is milder than a concentration gradient of the specific element contained in the second section in the thickness direction,
   a ratio of a1/a2 to b1/b2 is 0.33 or more and 0.95 or less, where the ratio a1/a2 represents a concentration gradient of the specific element, where a1 represents a mass of the specific element that is present on a surface side of the first section of the first catalyst layer when the first section is divided in half along the thickness direction of the first catalyst layer, and a2 represents a mass of the specific element that is present on another side than the surface side of the first section of the first catalyst layer, and
   where the ratio b1/b2 represents a concentration gradient of the specific element, where b1 represents a mass of the specific element that is present on a surface side of the second section of the first catalyst layer when the second section is divided in half along the thickness direction of the first catalyst layer, and b2 represents a mass of the specific element that is present on another side than the surface side of the second section of the first catalyst layer.

2. The exhaust gas purifying catalyst according to claim 1, wherein the concentration gradient a1/a2 is 0.9 to 3.0.

3. The exhaust gas purifying catalyst according to claim 1, wherein the concentration gradient b1/b2 is 1.1 to 5.0.

4. An exhaust gas purifying catalyst comprising a first catalyst layer including a first section and a second section in an exhaust gas flow direction, the first section being located on an upstream side in the exhaust gas flow direction relative to the second section,
   wherein the first section and the second section both contain a catalytically active component including a specific element,
   a concentration of the specific element is higher in the first section than in the second section,
   a concentration gradient of the specific element contained in the first section in a thickness direction of the first catalyst layer is milder than a concentration gradient of the specific element contained in the second section in the thickness direction,
   the first catalyst layer further includes a third section on a downstream side of the second section,
   the third section contains a catalytically active component including the specific element, and
   a concentration gradient of the specific element contained in the third section in the thickness direction of the first catalyst layer is milder than the concentration gradient of the specific element contained in the second section in the thickness direction.

5. The exhaust gas purifying catalyst according to claim 1, wherein a ratio of the concentration of the specific element contained in the first section to that in the second section is 1.1 or more, the concentration being in terms of mass per unit volume.

6. The exhaust gas purifying catalyst according to claim 4, wherein a ratio of the concentration of the specific element contained in the second section to that in the third section is 1.1 or more, the concentration being in terms of mass per unit volume.

7. The exhaust gas purifying catalyst according to claim 1, wherein the specific element is palladium.

8. The exhaust gas purifying catalyst according to claim 1, wherein a second catalyst layer is further provided on a surface of the first catalyst layer.

9. The exhaust gas purifying catalyst according to claim 8, wherein the specific element is palladium, and the second catalyst layer contains rhodium.

* * * * *